United States Patent [19]

Jessop

[11] 4,258,560
[45] Mar. 31, 1981

[54] SHAFT LOCK ASSEMBLY FOR VEHICLE STEERING COLUMN

[75] Inventor: Michael E. Jessop, Saginaw, Mich.

[73] Assignee: General Motors Corporation, Detroit, Mich.

[21] Appl. No.: 49,725

[22] Filed: Jun. 18, 1979

[51] Int. Cl.³ ............................................. B60R 25/02
[52] U.S. Cl. ...................................... 70/252; 180/287
[58] Field of Search ................... 180/287; 70/186, 252

[56] References Cited

U.S. PATENT DOCUMENTS

| | | | |
|---|---|---|---|
| 2,904,987 | 9/1959 | Panico | 70/252 |
| 3,490,255 | 1/1970 | Wight et al. | 70/252 |
| 3,553,986 | 1/1971 | Ball et al. | 180/287 |
| 3,648,490 | 3/1972 | Kimberlin | 70/252 |
| 4,029,168 | 6/1977 | Kramer | 180/287 |

Primary Examiner—David M. Mitchell
Attorney, Agent, or Firm—Charles R. White

[57] ABSTRACT

A vehicle steering column assembly incorporating a steering shaft lock plate assembly mounted between the steering wheel and the stationary upper housing of the column. The lock plate assembly includes a disc-like locking plate of a hard plastic material formed with a series of blind holes therein for receiving the end of a locking bolt. The plate has a central metallic hub which is internally splined which mesh with the splines of the steering shaft. The locking plate construction prevents the unauthorized displacement of the locking bolt and the steering of the vehicle.

3 Claims, 6 Drawing Figures

SHAFT LOCK ASSEMBLY FOR VEHICLE STEERING COLUMN

This invention relates to vehicle steering columns and more particularly to a new and improved shaft lock assembly for the column having a metallic hub portion splined to the steering shaft and having a plastic outer disc portion connected to the hub and formed with a series of blind openings therein for receiving a key actuated locking bolt.

The shaft lock assembly of this invention is specially designed to prevent the unauthorized displacement of the locking bolt to provide an anti-theft feature while providing for the improved connection between the steering shaft and the shaft lock assembly. This assembly incorporates a minimized number of components which includes an outer plastic disc that provides for the reduction in weight and cost as compared to prior shaft locks. The plastic disc eliminates the plastic cover member used with prior constructions to block the upper end of the locking bolt openings. In this invention a small metallic hub is centrally mounted in the plastic locking plate disc which allows for longer splines or serations to provide the necessary torsional strength to eliminate special hardening previously required in the hub component of prior metal constructions.

The shaft lock assembly of this invention has a plurality of blind holes equally spaced adjacent to the outer peripherary of the plastic outer disc member. These holes receive the locking bolt when the bolt is displaced to the locking position. The metallic hub is mounted in the center of the plastic disc and has arms radiating from the outer diameter of the hub which engage suitable depressions formed in the plastic disc. The shaft lock assembly is installed on the upper steering shaft and is retained in position by a snap ring mounted on the steering shaft.

It is a feature, object and advantage of this invention to provide a new and improved shaft lock assembly for a vehicle steering column operatively mounted at one end of the steering column to the steering shaft to provide blind holes for the steering shaft lock bolt to prevent the unauthorized turning of the steering shaft to thereby provide an anti-theft device.

Another feature, object and advantage of this invention is to provide a new and improved lock plate assembly for a vehicle steering column featuring a hardened plastic locking disc with a series of blind holes formed therein for receiving the key actuated locking bolt and which provides a baffle to block entry of tooling into the steering column and hamper the displacement of the locking bolt so that the steering wheel and shaft cannot be turned to thereby prevent the unauthorized use of the vehicle.

Another feature, object and advantage of this invention is to provide a new and improved lock plate assembly for a vehicle steering column which includes a disc-like locking plate of a hard plastic material formed with a series of blind holes therein for receiving the end of a locking bolt and to further incorporate a central metallic hub which is internally splined to mesh with the splines of the steering shaft and to provide locking plate construction that hampers the unauthorized displacement of the locking bolt and the turning of the vehicle steering shaft.

Another feature, object and advantage of this invention is to provide a new and improved two piece steering shaft lock assembly which has improved connection with the steering shaft employing a metallic hub member operatively connected to a plastic disc-like steering shaft lock plate which lock plate provides improved mounting for the internal horn contact slidably engaged with a brush member of the vehicle horn circuitry.

These and other features, objects and advantages of this invention will be more apparent from the following detailed description and drawing in which.

Figure 1:
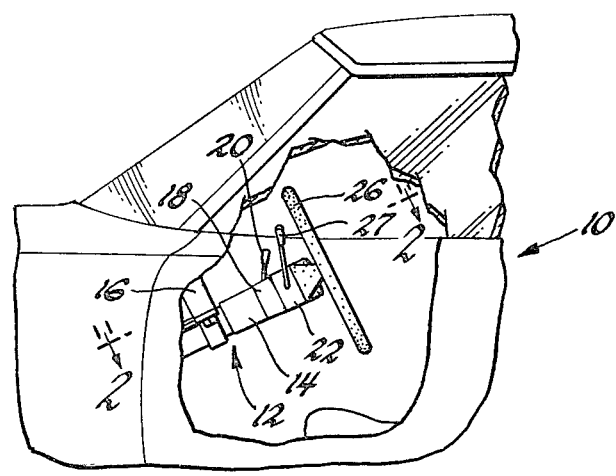
FIG. 1 is a fragmentary partially broken away elevational view of an automative vehicle body including a steering column and steering wheel assembly which incorporates the present invention.
Figure 2:
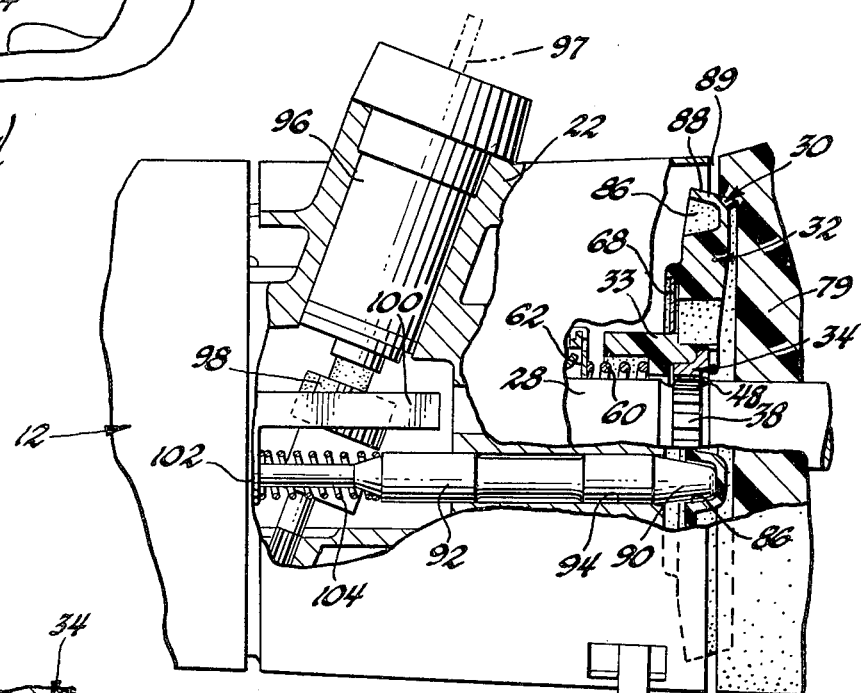
FIG. 2 is a partially broken away view taken generally along the plane indicated by lines 2-2 of FIG. 1 showing the lock plate and lock bolt of this invention.

With particular reference to FIG. 1 of the drawing there is shown a portion of a vehicle body 10 which includes a steering column assembly 12 mounted in the forward passenger compartment and which extends through the fire wall of the vehicle engine compartment not shown. The steering column assembly 12 includes a cylindrical upper jacket 14 that is secured by a suitable bracket assembly 16 to the instrument panel or other support structure mounted in the vehicle. A conventional shift bowl 18 supported for limited rotational movement on the upper end of jacket 14 may be turned by the vehicle operator through selector lever 20 to condition the power transmission of this vehicle for selected operating ranges. A generally cylindrical housing 22 internally secured to the fixed upper jacket is located between the shift bowl and a steering wheel 26 operatively mounted at the upper end of the column. Lever 27 extending outwardly from housing 22 operates turn signal and headlamp dimmer switches such as described in U.S. Pat. No. 4,088, 858 issued May 9, 1978 to R. L. Kramer hereby incorporated by reference.

The steering wheel 26 is drivingly connected to a rotatable cylindrical steering shaft 28 which extends axially within the column and which is operatively connected to the dirigible wheels of the vehicle through conventional steering gear and linkage.

The upper end of steering shaft 28 carries a shaft lock assembly 30 which includes a special hub described below and a disc-like locking plate 32 having a centralized axially extending cylindrical collar 33. This locking plate is a hard one-piece molding of a suitable plastic material having high strength and good wear characteristics. The center of the locking plate including the collar 33 is formed to accommodate a metallic hub 34 which fits closely therein so that there will be no relative rotation between these two parts. The hub 34 has an axially extending cylindrical body 35 formed with internal splines 36 which mesh with external splines 38 formed on the steering shaft 28. The steering shaft 28 is operatively connected to the steering wheel 26 in any suitable manner so that the steering wheel may be manually grasped and turned to turn the steering shaft.

The metal hub 34 has four arms 40 radially extending outwardly from the upper end of body 35. The arms 40 are arcuately spaced and fit closely into recesses 42 formed in the outer face of the locking plate between the reinforcing ribs 44 formed in the plate. The cylindrical body 35 of hub 34 is received within the annular opening 46 formed by the collar 33 of the locking plate. A snap ring 48 mounted in groove 50 formed in the steering shaft 28 abuts against a recessed end of the body of hub 34 to keep the hub and the locking plate together on the shaft 28 as the shaft lock assembly. The cylindrical collar 33 of the locking plate has arcuately spaced peripheral lobes 56 formed externally thereon which serve as cams for cancelling the turn signal switches after turn signal switch activation and after return of the steering wheel to straight ahead operation subsequent to cornering.

The locking plate collar 33 has a counter bore 58 formed therein for receiving a helical compression spring 60 disposed around the steering shaft 28. This compression spring seats between an internal wall 61 in collar 33 and the upper steering shaft bearing assembly 62 to urge the shaft lock assembly 30 upwardly against snap ring 48.

Figure 3:
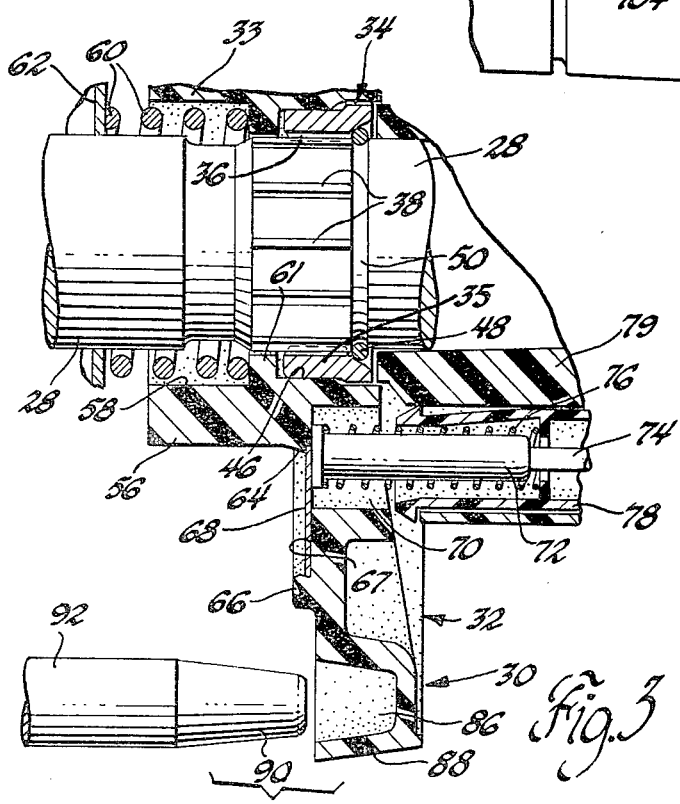
FIG. 3 is a view similar to FIG. 2 showing a portion of the shaft lock and lock bolt of this invention and further illustrating the provision for the horn contact used with this assembly.
Figure 4:
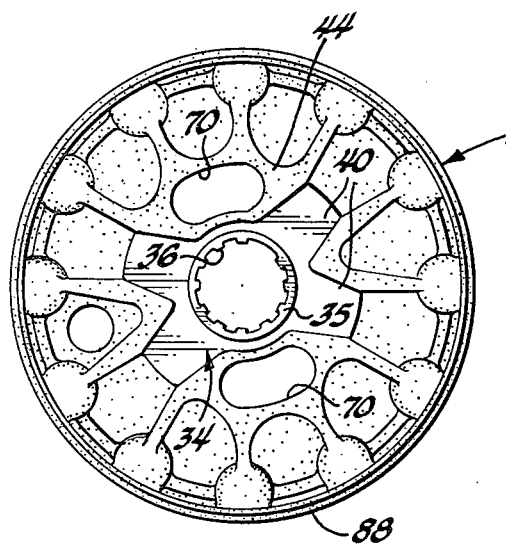
FIG. 4 is a top plan view of the shaft lock assembly of this invention.
Figure 5:
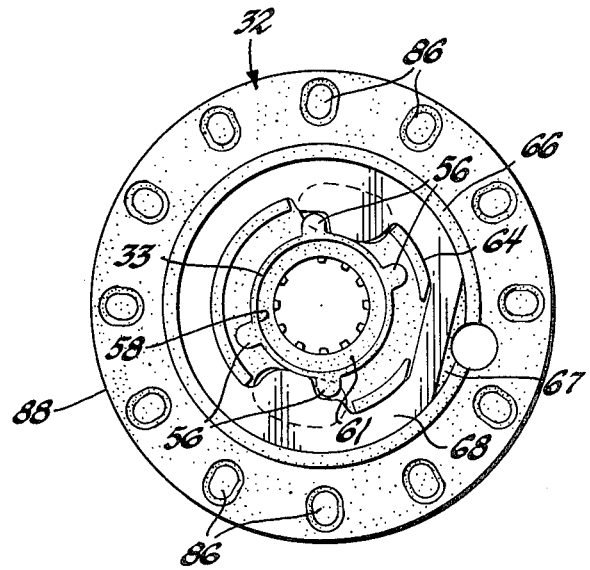
FIG. 5 is a bottom plan view of the shaft lock assembly of this invention.
Figure 6:
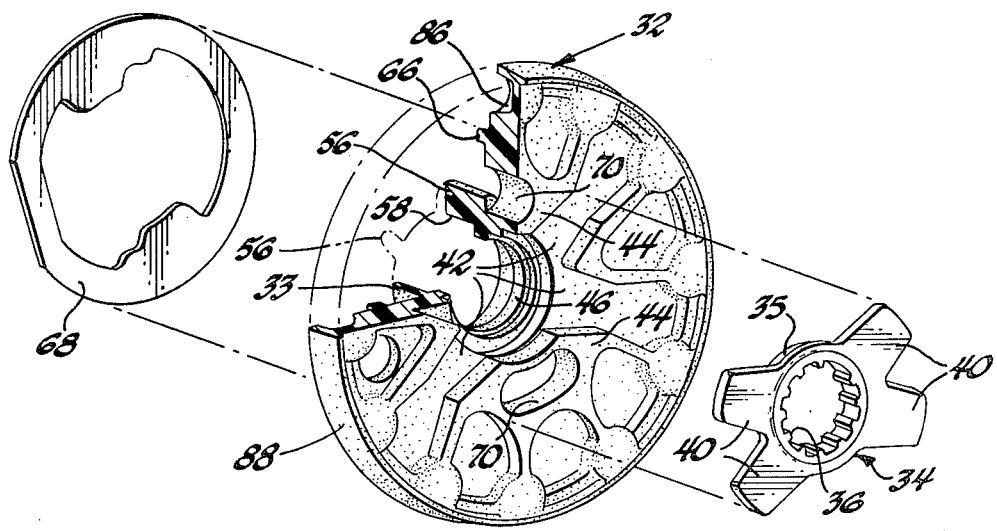
FIG. 6 is a perspective view of the shaft lock assembly of this invention with parts exploded away and with a portion of the shaft lock removed.

As best shown in FIG. 3 the underside of the shaft lock assembly 30 is formed with concentric and axially projecting circular ridges 64 and 66 which form an annular retainer groove 67 for reception of a metallic circular horn contact 68. This horn contact is preferably of thin brass material and may be inserted over the collar portion 33 and snapped past the ridges 64 and 66 into the retainer groove 67 so that the horn contact is held in position by the inwardly turned edges of ridges 64 and 66. With this construction the need for horn contact retainer tabs and openings for receiving such tabs as in prior contruction has been eliminated.

The opening 70 in the shaft lock assembly 30 receives the lower end portion of a cylindrical brush 72 electrically connected by conductor 74 to the horn switch in the pad assembly not shown of the steering wheel 26. Contact is maintained between the brush 72 and the horn contact 68 by action of a helical compression spring 76 disposed around the brush and mounted in a plastic tubular retainer 78 operatively mounted in the inner hub assembly 79 of the steering wheel 26 for rotation therewith.

The locking plate 32 of the shaft lock assembly has a plurality of blind holes 86 axially formed in a circular pattern adjacent to the outer peripheral wall 88 thereof. The peripheral wall 88 is a continuous annular surface which is disposed in the plane of clearance 89 between the hand wheel hub 79 and the upper end of fixed housing 22. Wall 88 effectively blocks the insertion of tooling into this clearance to deny access to the hand wheel lock bolt which will be hereinafter described.

The blind holes 86 are adapted to receive the end 90 of a locking bolt 92. This locking bolt is mounted for linear movement in an axial bore 94 in the fixed housing 22. The locking bolt is controlled by a key operated locking cylinder 96 as described in U.S. Pat. No. 3,648,490 issued Mar. 14, 1972 to D. R. Kimberlin et al for Coincidental Lock. With a key 97 inserted in the locking cylinder, the cylinder can be manually turned to turn a sector gear 98 drivingly connected thereto. This sector gear has teeth that mesh with the teeth of a linearly movable rack 100 which is connected to the engine ignition switch not illustrated. The rack 100 is also connected by a fork 102 to the lower end of locking bolt 92. When the key and lock cylinder are turned clockwise to move the rack 100 downward to close the ignition switch, the locking bolt 92 will be pulled away from engagement with the aligned blind hole 86 of the shaft lock assembly to permit the steering wheel to be turned. When the key is subsequently turned counterclockwise, toward the operator, to open the ignition switch, the rack will be moved linearly upwardly in the column and the fork acting and compression spring 104 will move the locking bolt back into one of the blind holes aligned therewith.

With this shaft lock assembly the disc-like locking plate 32 is interposed in the clearance 89 between the hub of the steering wheel and the upper end of the steering column. With the clearance blocked, access to the locking bolt through tooling is severely reduced. Thus with the outer side of the locking plate solid so that holes 86 are covered and with the wall 88 blocking the clearance 89, tooling cannot be readily inserted into the clearance to depress the locking bolt 92 against the spring and held in the depressed condition to defeat the steering wheel lock and thereby allow the steering wheel to be turned.

With this invention the prior all metal shaft locks have been replaced by a new and improved lightweight plastic and metal hub shaft lock assembly which requires no special cover plate to prevent the unauthorized depression of the locking bolt. Furthermore, with this new and improved shaft lock the hub has an elongated body 45 with splines of sufficient size to carry the load without any specific hardening to meet load requirements occuring between the steering shaft and the shaft lock assembly connection.

While a preferred embodiment of the invention has been shown and described to illustrate the invention, other modifications will become apparent to those skilled in the art. Accordingly, the scope of this invention is set forth in the following claims.

The embodiments of the invention in which an exclusive property or privilege is claimed are defined as follows:

1. A steering column assembly for an automotive vehicle comprising a steering column jacket, a steering shaft rotatably mounted within said jacket, a housing fixed to the upper end of said jacket, a steering wheel operatively mounted at the upper end of said housing and drivingly connected to said steering shaft, a steering shaft lock assembly fixed at the upper end of said steering shaft for rotation therewith, said shaft lock assembly being mounted in a transverse plane between an upper extremity of said housing and the lower extremity of said steering wheel, lock bolt means supported by said housing for axial sliding movement therein between a locking position engaged with said shaft lock assembly to prevent the rotational movement of said steering shaft and an unlocked position removed from said shaft lock assembly to allow said steering shaft to be turned, said shaft lock assembly comprising a metallic hub drivingly connected to said steering shaft and a plastic disc portion, said hub portion having radial arm means, said disc portion having radial recess means for said arm means to drivingly couple said hub portion to said disc portion, said disc portion having a series of arcuately spaced blind recesses axially formed therein for receiving said lock bolt means when said lock bolt means is moved axially into said locking position, said disc portion having a peripheral generally cylindrical edge to hamper entry of tooling into the interior of said column, said disc portion providing a continuous outer surface for forming said blind recesses so that said lock bolt means cannot be displaced by tooling to said unlocking position to thereby prevent the unauthorized rotation of said steering wheel and said steering shaft for vehicle steering purposes.

2. A steering column assembly for an automotive vehicle comprising a steering column jacket, a steering shaft rotatably mounted within said jacket, a housing fixed to the upper end of said jacket, a steering wheel operatively mounted at the upper end of said housing having clearance therebetween and drivingly connected to said steering shaft, a steering shaft lock assembly fixed at the uppr end of said steering shaft for rotation therewith, said shaft lock assembly being mounted in a plane transverse of said steering shaft and including said clearance, a lock bolt supported by said housing for axial sliding movement therein between a locking position engaged with said shaft lock assembly to prevent the rotational movement of said steering shaft and an unlocked position removed from said shaft lock assembly to allow said steering shaft to be turned, said shaft lock assembly comprising a centralized metallic hub drivingly connected to said steering shaft and a plastic disc portion in which said hub is nested for drivingly connecting said hub and disc porion, said plastic disc portion having a series of arcuately spaced and axially extending blind recesses formed therein for receiving said lock bolt when said lock bolt is moved axially into said locking position, said disc portion having an annular peripheral edge to block said clearance and entry of tooling into the interior of said column, said disc portion providing a continuous upper surface for forming said blind recesses so that said lock bolt means cannot be displaced by tooling to said unlocked position to thereby prevent the unauthorized rotation of said steering wheel and said steering shaft.

3. A steering column assembly for an automotive vehicle comprising a steering column jacket, a steering shaft rotatably mounted within said jacket, a housing fixed to the upper end of said jacket, a steering wheel operatively mounted at the upper end of said housing and drivingly connected to said steering shaft, a steering shaft lock assembly fixed at the upper end of said steering shaft for rotation therewith, said shaft lock assembly being mounted in a plane transverse of said steering shaft and including the clearance between the upper extremity of said housing and the lower extremity of said steering wheel, a lock bolt supported by said housing for axial sliding movement therein between a locking position engaged with said shaft lock assembly to prevent the rotational movement of said steering shaft and unlocked position removed from said shaft lock assembly to allow said steering shaft to be turned, said shaft lock assembly comprising a metallic hub drivingly connected to said steering shaft and a plastic disc portion, having radial recesses disposed around said metallic hub, said metallic hub having radial arms received by said recesses to operatively connect said hub and said disc portion together, said disc portion having a series of arcuately spaced blind recesses axially formed therein facing said lock bolt for receiving said lock bolt when moved axially into said locking position, said disc portion having an annular peripheral edge to hamper entry of tooling into the interior of said column, said disc portion providing a continuous outer surface for forming said blind recesses so that said lock bolt cannot be displaced by tooling to said unlocked position, said plastic disc portion having a circular groove formed in the lower face thereof, and horn circuitry contact means supported in said groove.

* * * * *